(12) United States Patent
Vaccari et al.

(10) Patent No.: US 9,622,038 B2
(45) Date of Patent: Apr. 11, 2017

(54) GLOBAL-POSITIONING SYSTEM (GPS) UPDATE INTERVAL BASED ON SENSOR DATA

(71) Applicant: Facebook, Inc.

(72) Inventors: Andrea Vaccari, San Francisco, CA (US); Gabriel Grisè, San Francisco, CA (US); Alberto Tretti, San Francisco, CA (US); Mayank Lahiri, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/736,781

(22) Filed: Jun. 11, 2015

(65) Prior Publication Data

US 2015/0281904 A1 Oct. 1, 2015

Related U.S. Application Data

(63) Continuation of application No. 13/760,692, filed on Feb. 6, 2013, now Pat. No. 9,088,865, which is a (Continued)

(51) Int. Cl.
*H04W 4/02* (2009.01)
*G06Q 50/00* (2012.01)
(Continued)

(52) U.S. Cl.
CPC ............ *H04W 4/025* (2013.01); *G06Q 50/01* (2013.01); *H04W 4/001* (2013.01); *H04W 4/02* (2013.01); *H04W 4/206* (2013.01)

(58) Field of Classification Search
CPC ........ H04W 4/02; H04W 4/001; H04W 4/206
(Continued)

(56) References Cited

U.S. PATENT DOCUMENTS 6,975,941 B1 * 12/2005 Lau et al. .................. 701/491
8,036,679 B1 10/2011 Barbeau
(Continued)

FOREIGN PATENT DOCUMENTS

CN 102075854 5/2011
CN 102843415 12/2012
(Continued)

OTHER PUBLICATIONS

Patent Examination Report No. 1 for Australian Patent Application No. 2013271709, Mar. 7, 2016.
(Continued)

*Primary Examiner* — Qun Shen
(74) *Attorney, Agent, or Firm* — Baker Botts L.L.P.

(57) ABSTRACT

In one embodiment, a method includes transmitting at a pre-determined polling frequency an activation signal waking from a sleep mode an application on a mobile computing device and causing the application to activate a location service of the mobile computing device for a pre-determined sampling duration. The pre-determined polling frequency and the pre-determined sampling duration are determined at least in part by detecting a movement of the mobile computing device. The method also includes receiving location data from the mobile computing device after the pre-determined sampling duration. The location data is responsive to a transmission signal.

18 Claims, 6 Drawing Sheets

Related U.S. Application Data continuation-in-part of application No. 13/490,394, filed on Jun. 6, 2012, now abandoned.

(51) Int. Cl.
*H04W 4/00* (2009.01)
*H04W 4/20* (2009.01)

(58) Field of Classification Search
USPC ..................................................... 455/456.1
See application file for complete search history.

(56) References Cited

U.S. PATENT DOCUMENTS

| | | | |
|---|---|---|---|
| 2006/0256008 A1* | 11/2006 | Rosenberg | G01C 21/20 342/367 |
| 2007/0099471 A1 | 5/2007 | Liang | |
| 2008/0070593 A1* | 3/2008 | Altman | H04L 63/102 455/457 |
| 2011/0128183 A1* | 6/2011 | Marshall | 342/357.29 |
| 2011/0215903 A1* | 9/2011 | Yang | G01C 21/20 340/8.1 |
| 2011/0238755 A1* | 9/2011 | Khan et al. | 709/204 |
| 2011/0271205 A1* | 11/2011 | Jones | H04N 7/157 715/753 |
| 2012/0078501 A1 | 3/2012 | Haleem | |
| 2012/0116672 A1* | 5/2012 | Forutanpour | G01C 21/20 701/431 |
| 2012/0119948 A1* | 5/2012 | Tsuda | 342/357.29 |
| 2012/0154220 A1 | 6/2012 | Harper | |
| 2013/0006749 A1* | 1/2013 | Fink et al. | 705/14.39 |

FOREIGN PATENT DOCUMENTS

| | | |
|---|---|---|
| CN | 104350793 | 2/2015 |
| JP | H04-370778 | 12/1992 |
| JP | H11-295410 | 10/1999 |
| JP | 2002-156438 | 5/2002 |
| JP | 2004-233150 | 8/2004 |
| JP | 2006-245930 | 9/2006 |
| JP | 2007-006229 | 1/2007 |
| JP | 2011-504578 | 2/2011 |
| JP | 2011-191146 | 9/2011 |
| WO | WO 2007/099471 A1 * | 9/2007 |
| WO | 2009/109736 | 9/2009 |
| WO | 2011/083801 | 7/2011 |
| WO | 2013/184733 | 12/2013 |

OTHER PUBLICATIONS

Notification of Reasons for Rejection for JP 2015-557016, Jan. 5, 2016.
Extended European Search Report for EP 15191405.8-1853, Jan. 25, 2016.
Notification of Reasons for Rejection for JP 2015-516153, Aug. 23, 2016.
Extended European Search Report for EP 14749284.7-1812, Aug. 19, 2016.
Notice of Allowance for Korean Patent Application 10-2015-7024232, May 23, 2016.
Notification of the First Office Action for CN Patent Application 2014800195258, Apr. 12, 2016.
Second Office Action for CN 2014-800195258 Oct. 20, 2016.
Notification of the Third Office Action, State Intellectual Property Office of the People's Republic of China, Patent Application No. 2014800195258, Jan. 3, 2017 (with English translation).

* cited by examiner

GLOBAL-POSITIONING SYSTEM (GPS) UPDATE INTERVAL BASED ON SENSOR DATA

PRIORITY

This application is continuation under 35 U.S.C. §120 of U.S. patent application Ser. No. 13/760,692, filed 6 Feb. 2013, which is a continuation-in-part under 35 U.S.C. §120 of U.S. patent application Ser. No. 13/490,394, filed 6 Jun. 2012, which are incorporated herein by reference.

TECHNICAL FIELD

This disclosure generally relates to location tracking.

BACKGROUND

A mobile electronic device, such as a smartphone, tablet device, laptop computer, etc., has general computing capabilities. The mobile electronic device may execute one or more applications such as for example, communications through short-message service (SMS), communications through multimedia-messaging service (MMS), accessing e-mail, accessing Internet content, communications through a short-range wireless (e.g. infrared or BLUETOOTH), business applications, gaming, or photography using a camera integrated into the mobile electronic device. A smartphone is a particular class of mobile electronic device with telephony capabilities provided through a radio-frequency (RF) communication link whilst moving within a geographic area. The smartphone may have a touch sensor integrated with a display screen, where the touch sensor detects touch inputs and the display screen displays content. The smartphone connects to a cellular network for access to the public telephone network and Internet content.

SUMMARY OF PARTICULAR EMBODIMENTS

In particular embodiments, a server may be able to automatically and without any manual input from the user, track the location of a mobile computing device. The server may ping the mobile computing device at pre-determined intervals to obtain location information through an application of the mobile computing device running in a background mode. The server adaptively adjusts the global-positioning system (GPS) data collection interval and duration depending on whether mobile device is moving or stationary. Determination of whether the mobile computing device is moving or is stationary is based on comparing the current location of the mobile computing device with the location from the previous reading or input from sensors of the mobile computing device. For example, if the server may determine the user is moving based on accelerometer data, the data collection interval and duration may be decreased to capture less accurate, but more frequent GPS readings.

DESCRIPTION OF EXAMPLE EMBODIMENTS

Figure 1:
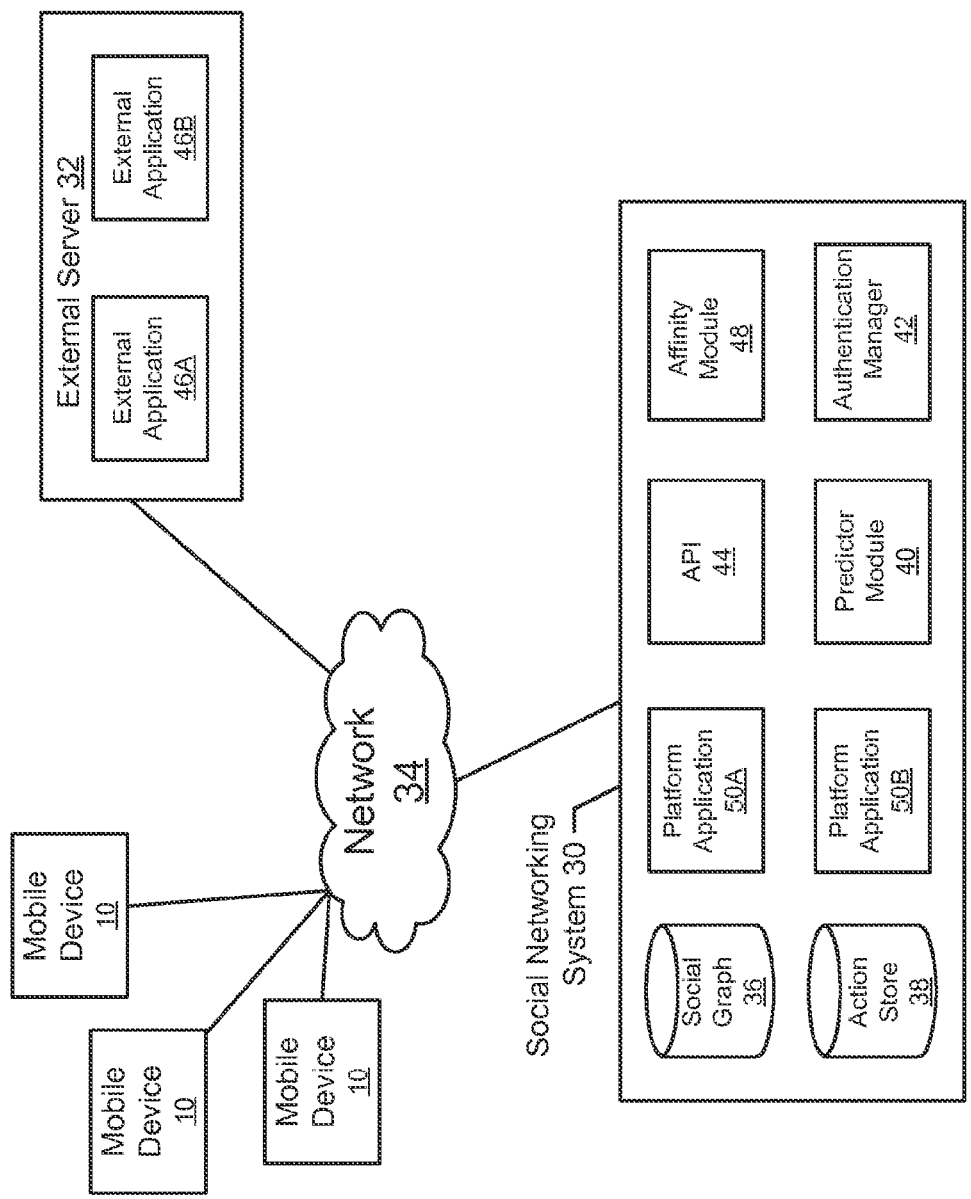
FIG. 1 illustrates an example social-networking system.

FIG. 1 illustrates an example social-networking system. In the example of FIG. 1, a social-networking system 30 and an external server 32 are coupled through a network 34. Network 34 generally represents a network or collection of networks (such as for example the Internet, a corporate intranet, a virtual private network (VPN), a local-area network (LAN), a wireless-local-area network (WLAN), a cellular network, a wide-area network (WAN), a metropolitan-area network (MAN), or a combination of two or more such networks) over which social-networking system 30 or external server 32 may communicate with mobile device 10.

One or more users may interact with social-networking system 30 using mobile devices 10. Mobile devices 10 may communicate with social-networking system 30 via an application such as a web browser or native application executed on processor of mobile devices 10. In particular embodiments, one or more mobile devices 10 may be a smartphone, as described above. As an example and not by way of limitation, interactions between mobile devices 10 and social-networking system 30 may include viewing profiles of other users of social-networking system 30, contributing and interacting with media items, joining groups, listing and confirming attendance at events, checking in at locations, liking certain pages, creating pages, and performing other tasks that facilitate social interaction.

Social-networking system 30 includes components used to store information about users and objects represented in the social networking environment and relationships among the users and objects. The social-networking system 30 may include components enabling interactions to mobile devices 10, as described below. Components of social-networking system 30 may be hosted on one or more servers. This disclosure contemplates any suitable servers, such as servers that are internal to social-networking system 30 or external servers 32. As an example and not by way of limitation, one or more servers may each include one or more advertising servers, applications servers, catalog servers, communications servers, database servers, exchange servers, fax servers, file servers, game servers, home servers, mail servers, message servers, news servers, name or domain-name servers (DNS), print servers, proxy servers, sound servers, standalone servers, web servers, or web-feed servers. In particular embodiments, a server includes hardware, software, or both for providing the functionality of the server. As an example and not by way of limitation, a server that operates as a web server may be capable of hosting websites containing web pages or elements of web pages and include appropriate hardware, software, or both for doing so. In particular embodiments, a web server may host Hyper Text Markup Language (HTML) or other suitable files or dynamically create or constitute files for web pages on request. In response to a Hyper Text Transfer Protocol (HTTP) or other request from mobile devices 10, the web server may communicate one or more such files to mobile devices 10. As another example, a server that operates as a database server may be capable of providing an interface for interacting with one or more data stores (such as for example, action store 38 described below). Where appropriate, a server may include one or more servers; be unitary or distributed; span multiple locations; span multiple machines; span multiple datacenters; or reside in a cloud, which may include one or more cloud components in one or more networks.

A social graph 36 of social-networking system 30 stores the connections each user has with other users of social-networking system 30. In particular embodiments, social graph 36 may also store second-order connections. The connections may thus be direct or indirect. As an example and not by way of limitation, if user A is a first-order connection of user B but not of user C, and B is a first-order connection of C, then C is a second-order connection of A on social graph 36. An action store 38 stores actions that have been performed by the users of social-networking system 30, along with an indication of the time associated with those actions and references to any objects related to the actions. Action store 38 may store statistics for specified categories of actions. As an example and not by way of limitation, for a given user, action store 38 may contain a number of stories posted in 30 days by a user, a number of photos posted by the user in 30 days, or a number of distinct users that received comments of the user within the past 30 days. For a given connection between two users, user A and user B, action store 38 may contain actions such as the number of profile page views from user A to user B, the number of photo page views from user A to user B, and the number of times user A and user B were tagged in the same photo, and these actions may be associated with a timestamp or may be filtered by a cutoff (e.g., 24 hours, 90 days, etc.). The actions recorded in action store 38 may be farmed actions, which are performed by a user in response to the social-networking system 30 providing suggested choices of actions to the user.

A predictor module 40 is responsible for computing a set predictor functions that predict whether a user will perform a set of corresponding actions. Each predictor function may be representative of a user's interest in a particular action associated with the predictor function. The historical activity of a user may be used as a signal of a user's future interest in the same activity. In particular embodiments, the predictor function is generated using a machine-learned algorithm, that is trained using a user's historical activity associated with an action. Predictor module 40 thus provides a predictor function for each of a set of actions, where a predictor function may take as an input the user's historical activity and then outputs a measure of the likelihood that the user will engage in the corresponding activity.

An authentication manager 42 authenticates users on mobile devices 10 as being registered users of social-networking system 30. Authentication manager 42 may allow users to log into social-networking system 30 from mobile devices 10 through an application supporting social-networking system 30. An application programming interface (API) 44 works in conjunction with authentication manager 40 to validate users via external applications 46A-B stored on external server 32. In particular embodiments, authentication manager 42 in conjunction with API 44 may periodically verify account information of the user, as described below.

In particular embodiments, social-networking system 30 may include an authorization server (or other suitable component(s)) that allows users to opt in to or opt out of having their actions logged by social-networking system 30 or shared with other systems (e.g. third-party systems 32), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate.

An affinity module 48 provides a measure of affinity based on input data about the user from the social-networking system 30 using the predictor functions. Various processes may request a measure of affinity from affinity module 48. As an example and not by way of limitation, the processes may include basic social-networking system 30 functionality, such as for example newsfeed algorithms, advertising-targeting algorithms, or friend-suggestion algorithms. Other processes that request measures of affinity may be executed by one or more platform applications 50A-B, which are applications that operate within the social-networking system 30 but may be provided by third parties other than an operator of the social-networking system 30. Platform applications 50A-B may include social games, messaging services, or any suitable application that uses the social platform provided by social-networking system 30.

In particular embodiments, the processes requesting a measure of affinity for a user may include one or more external applications 46A-B executed on external server 32. External applications 46A-B may interact with the social-networking system 30 via API 44. External applications 46A-B can perform various operations supported by the API 44, such as enabling users to send each other messages or SMS messages through social-networking system 30 or showing advertisements routed through social-networking system 30. Herein, reference to SMS messages encompasses messages in text and other forms of content, such as for example, images or links to web content.

One or more platform applications 50A-B executed on social-networking system 30 or external applications 46A-B executed on external server 32 is able to automatically and without any manual input from the user, track the location of mobile device 10. In particular embodiments, social-networking system 30 or external server 32 polls or "pings" mobile device 10 using a activation signal transmitted at a polling frequency to obtain location information. In particular embodiments, social-networking system 30 may poll the application of mobile device 10 for location data by transmitting the activation signal through network 34 using a wireless communication protocol such as for example, WI-FI or third-generation mobile telecommunications (3G). As an example and not by way of limitation, social-networking system 30 may periodically poll an application of mobile device 10 running in a background or "sleep" mode. In particular embodiments, the application is an event-driven application that responds to the activation signal from social-networking system 30 or external server 32. The social-networking system 30 or external server 32 may adaptively adjust the pre-determined sampling duration and polling frequency of the location determination performed by the application depending on the travel distance of mobile device 10. As an example and not by way of limitation, the pre-determined sampling duration and polling frequency may be adaptively adjusted based at least in part on whether mobile device 10 is moving or stationary. When mobile device 10 is moving and the travel distance is relatively large, the social-networking system 30 may request location data from the application of mobile device 10 more frequently, but with lower accuracy. In particular embodiments, the location service of mobile device 10 is activated for the pre-determined sampling duration through transmission of one or more location-service activation signals that keeps the application of mobile device 10 active for the pre-determined sampling duration. As an example and not by way of limitation, the application of mobile device 10 may receive an activation signal to wake the application every 4 minutes and one or more location-service activation signals that activate the location service for 10 seconds when moving. When mobile device 10 is moving, frequent location measurements allow movement to be monitored without calculating large changes in position. Since the position of mobile device 10 is in flux, high-accuracy-position determination of mobile device 10 is relatively unimportant. Although this disclosure describes a particular number of signals that wakes the application and causes the application to activate the location service of the mobile device, this disclosure contemplates any suitable number of signals to wake the application and cause the application to activate the location service.

As another example, when mobile device 10 is stationary and the travel distance is relatively small, the social-networking system 30 may request location data from mobile device 10 less frequently but with higher accuracy. As an example and not by way of limitation, the application of mobile device 10 may receive the activation signal every 10 minutes and one or more location-service activation signals to activate the location service of mobile device 10 for 20 seconds when stationary. Since the position of mobile device 10 is relatively fixed, frequent location measurements may not provide additional position information. When mobile device 10 is stationary, it is relatively important to determine the position of mobile device 10 with a high degree of accuracy. As an example and not by way of limitation, particular social-networking functions, such as for example location-based recommendations or location-based notifications may depend on having a relatively accurate position measurement.

Social-networking system 30 may adaptively adjust the pre-determined sampling duration and polling frequency based at least in part on determining whether a movement of mobile device 10 has occurred. Herein, reference to a movement encompasses any suitable movement from one position in space to another position in space. As described above, movement of mobile device 10 may be determined based at least in part on the travel distance of mobile device, environmental data obtained from one or more sensors of mobile device 10, or any combination thereof, as appropriate. In particular embodiments, the social-networking system may determine movement of mobile device 10 based on a signal from mobile device 10 based at least in part on mobile device 10 processing the environmental data. As an example and not by way of limitation, social-networking system 30 may transmit the activation signal to mobile device 10 with a lower polling frequency and larger pre-determined sampling duration in response to receiving data from a sensor of mobile device 10 indicating mobile device 10 is stationary. As another example, social-networking system 30 may transmit the activation signal to mobile device 10 with a higher polling frequency and a lower pre-determined sampling duration in response from a sensor of mobile device 10 indicating mobile device 10 is in motion. Although this disclosure describes detecting movement of a mobile device using particular data received from the mobile device, this disclosure contemplates detecting movement of the mobile device using any suitable data or any suitable combination of data, such as for example location data and sensor data, received from the mobile device.

The application activates the location service of mobile device 10 in response to receiving the location-service activation signal. In particular embodiments, the location service of mobile device 10 may use one or more methods of location determination, such as for example, using the location of one or more cellular towers, crowd-sourced location information associated with a WI-FI hotspot, or the global-positioning system (GPS) function of mobile device 10. In particular embodiments, the application of mobile device 10 may transmit location data and other relevant data, such as for example the signal strength from nearby cellular towers. In particular embodiments, the operating system (OS) of mobile device 10 may arbitrate collecting data by the various methods used by the location service of mobile device 10. As an example and not by way of limitation, the method used by the location service of mobile device 10 may depend at least in part on the pre-determined sampling duration of the location measurement. As an example and not by way of limitation, the application may use GPS data as the primary source of location information depending at least in part on whether mobile device 10 is able to acquire GPS data within the pre-determined sampling duration. As another example, if mobile device 10 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

The accuracy of the location data measured by the application is determined at least in part by the pre-determined sampling duration the location service of mobile device 10 is activated. The calculation of the travel distance of mobile device 10 is based on comparing the current location of mobile device 10 with the location from the previous reading. The travel distance of mobile device 10 may be approximated by the following equation:

$$\text{distance}_{mob} = (\text{position}_t - \text{position}_{t-1}) \quad (1)$$

Position$_t$ is the position of mobile device 10 at the most recent location reading and position$_{t-1}$ is the position of mobile device 10 at the second-most-recent location reading. As an example and not by way of limitation, when the travel distance of mobile device 10 is substantially equal or less than a pre-determined distance, social-networking system 30 or external server 32 may determine mobile device 10 is stationary. In particular embodiments, the pre-determined distance may be the measurement accuracy of the GPS function of mobile device 10. Although this disclosure describes adjusting the polling frequency and sampling duration to a particular number of discrete settings based on the travel distance, this disclosure contemplates adjusting the polling frequency and sampling duration to any suitable number of discrete settings or a continuum of settings based on the travel distance.

In particular embodiments, the application executed on mobile device 10 receives the activation signal through network 34 that wakes the application from the sleep mode and activates the location service of mobile device 10 for a pre-determined sampling duration (e.g. 10 seconds). As described above, social-networking system 30 or external server 32 may adjust the polling frequency (i.e. the time interval between signal transmissions) and sampling duration according to the travel distance of mobile device 10. As described above, the pre-determined sampling duration depends at least in part on the desired accuracy of the location data. Increasing the pre-determined sampling duration increases the accuracy of the location of mobile device 10 due at least in part to the application having a higher probability of acquiring GPS data or the location service being able to acquire more detailed GPS data. In particular embodiments, the pre-determined sampling duration may be determined at least in part by the battery level of mobile device 10. As an example and not by way of limitation, mobile device 10 may transmit data indicative of the battery level of mobile device 10 and the pre-determined sampling duration may be decreased by social-networking system 30 or external server 32 if the battery level of mobile device 10 is low. As another example, the polling frequency may be decreased if the battery level of mobile device 10 is low.

In particular embodiments, social-networking system 30 or external server may transmit a transmission signal to the application at the end of the pre-determined sampling duration. The application transmits the acquired location data and other relevant data to social-networking system 30 or external server 32 in response to receiving the transmission signal. After the application has transmitted the location data, the application may revert to the sleep mode and the location service may be turned off until the next polling signal is received in accordance with the polling frequency, such that the location-data-acquisition sequence as described above is repeated. In particular embodiments, additional location-service activation signals are periodically transmitted to mobile device 10 during location data acquisition to keep the application from reverting to the sleep mode before the location data is acquired.

In particular embodiments, transmission of the location data by the application may trigger an event-driven social-networking function. As an example and not by way of limitation, after receiving location data from mobile device 10, social graph 36 of social-networking system 30 may be accessed to determine if a friend of the user is in the same proximity of the user. As another example, social-networking system 30 may determine if another user with similar interests is in the same location as the user based on actions stored in the action store 38 of social-networking system 30. As another example, transmission of the location data may update the status of the user as being online on social-networking system 30. In particular embodiments, action store 36 may store interactions of the user of mobile device 10 with other users in the same location based on the location updates made to social-networking system 30 or external server 32. As an example and not by way of limitation, social-networking system 30 may prompt the user to confirm a meeting with another user who is in the same location. In particular embodiments, social-networking system 30 or external server 32 may adjust the amount of data sent to mobile device 10 based on whether mobile device 10 is stationary or moving. As an example and not by way of limitation, social-networking system 30 may infer that when mobile device 10 is moving, mobile device 10 may be switching between different cellular towers and send lower-bandwidth information.

In particular embodiments, the application may acquire data to provide context to the location data of mobile device 10. The application may activate sensors of mobile device 10 to collect environmental data. As an example and not by way of limitation, the application may activate the microphone of mobile device 10 to measure ambient noise. As another example, the application may poll an accelerometer of mobile device 10 to determine a mode of transportation being used by the user.

Figure 2A:
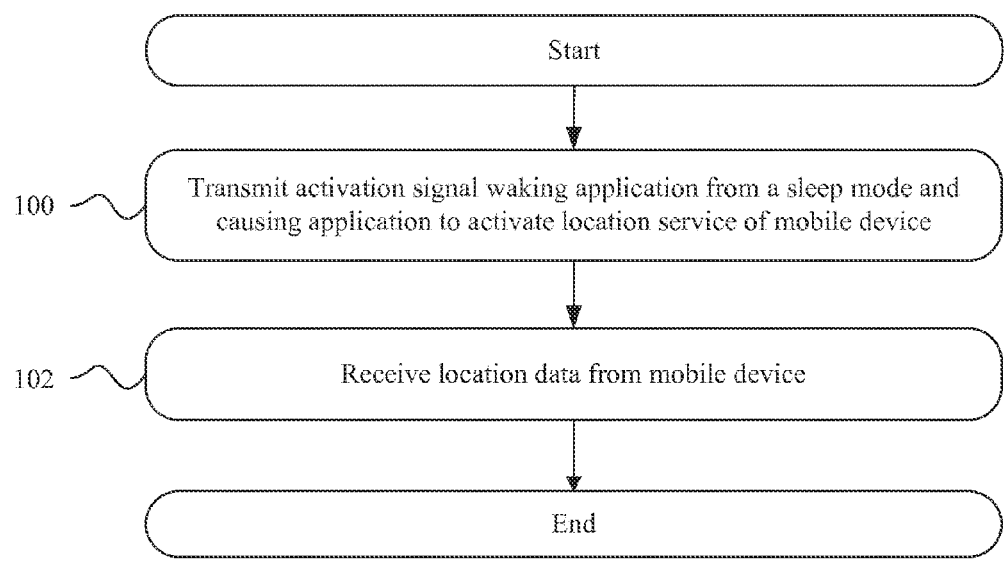
FIG. 2A illustrates an example method for ambient-location tracking.

FIG. 2A illustrates an example method for ambient location tracking. The method may start at Step 100, where an activation signal is transmitted by a server at a pre-determined polling frequency that wakes an application on a mobile device from a sleep mode and causing the application to activate the location service of the mobile device for a pre-determined sampling duration. In particular embodiments, the pre-determined polling frequency and the pre-determined sampling duration are determined at least in part by a travel distance of the mobile device. In other particular embodiments, the pre-determined sampling duration may be adjusted depending at least in part on whether the mobile device is stationary or in motion. At Step 102, the server receives location data from the mobile device after the pre-determined sampling duration, at which point the method may end. The location data is responsive to the transmission signal. In particular embodiments, Steps 100-102 are recursively repeated. Although this disclosure describes and illustrates particular steps of the method of FIG. 2A as occurring in a particular order, this disclosure contemplates any suitable steps of the method of FIG. 2A occurring in any suitable order. Moreover, although this disclosure describes and illustrates particular components carrying out particular steps of the method of FIG. 2A, this disclosure contemplates any suitable combination of any suitable components carrying out any suitable steps of the method of FIG. 2A.

Figure 2B:
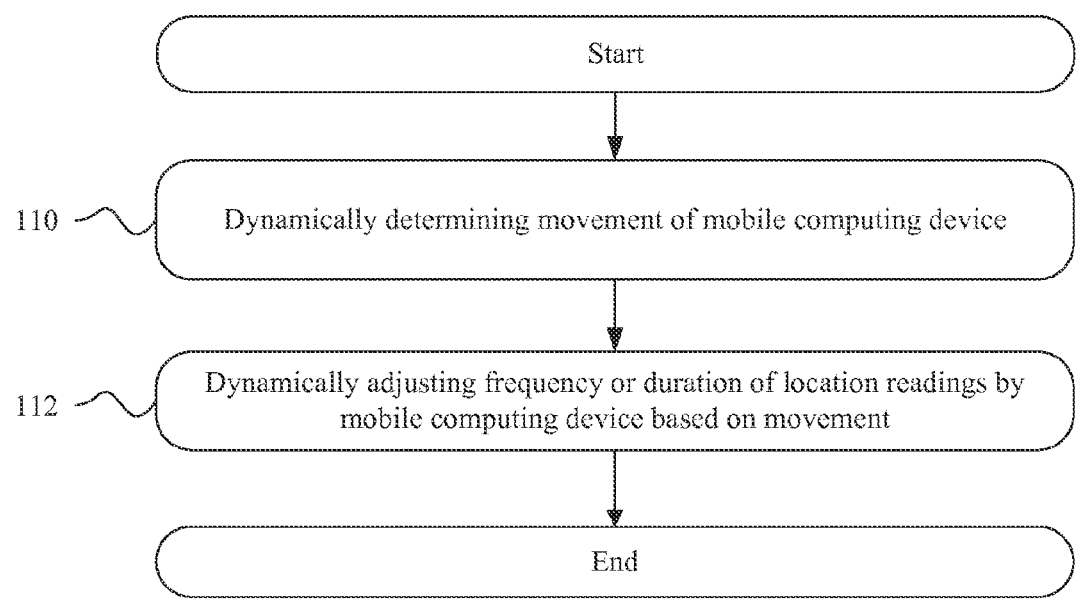
FIG. 2B illustrates an example method for movement-based interval updates.

FIG. 2B illustrates an example method for movement-based interval updates. The method may start at step 110, where a computing device dynamically determines movement of a mobile computing device without manual user input. At step 112, the computing device dynamically adjusts without manual user input a frequency or duration of location readings by the mobile computing device based on the movement of the mobile computing device, at which point the method may end. The location data is responsive to the transmission signal. Although this disclosure describes and illustrates particular steps of the method of FIG. 2B as occurring in a particular order, this disclosure contemplates any suitable steps of the method of FIG. 2B occurring in any suitable order. Moreover, although this disclosure describes and illustrates particular components carrying out particular steps of the method of FIG. 2B, this disclosure contemplates any suitable combination of any suitable components carrying out any suitable steps of the method of FIG. 2B.

Figure 3:
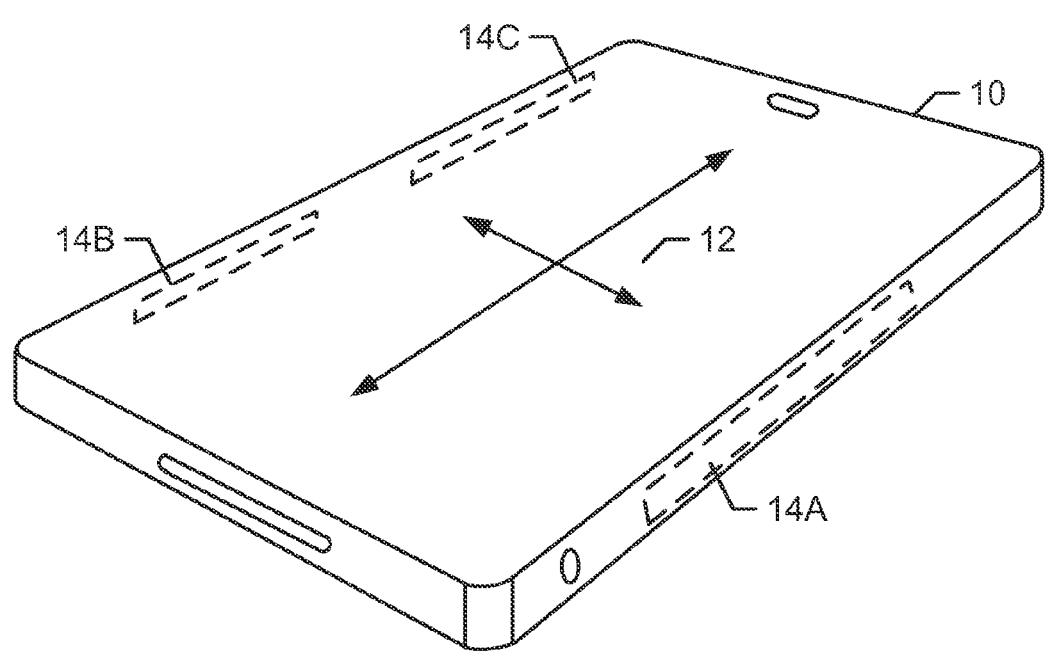
FIG. 3 illustrates an example mobile device.

FIG. 3 illustrates an example mobile device. This disclosure contemplates mobile device 10 taking any suitable physical form. Herein, reference to a mobile device encompasses any suitable system capable of connecting to a network and determining its geographical location. As an example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch screen 12 as an input component. In the example of FIG. 3, touch screen 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 14A-C may be incorporated into one or more sides of mobile device 10. Antennae 14A-C are components that convert electric current into radio waves, and vice versa. During transmission of signals, a transmitter applies an oscillating radio frequency (RF) electric current to terminals of antenna 14A-C, and antenna 14A-C radiates the energy of the applied the current as electromagnetic (EM) waves. During reception of signals, antennae 14A-C convert the power of an incoming EM wave into a voltage at the terminals of antennae 14A-C. The voltage may be transmitted to a receiver for amplification.

Figure 4:
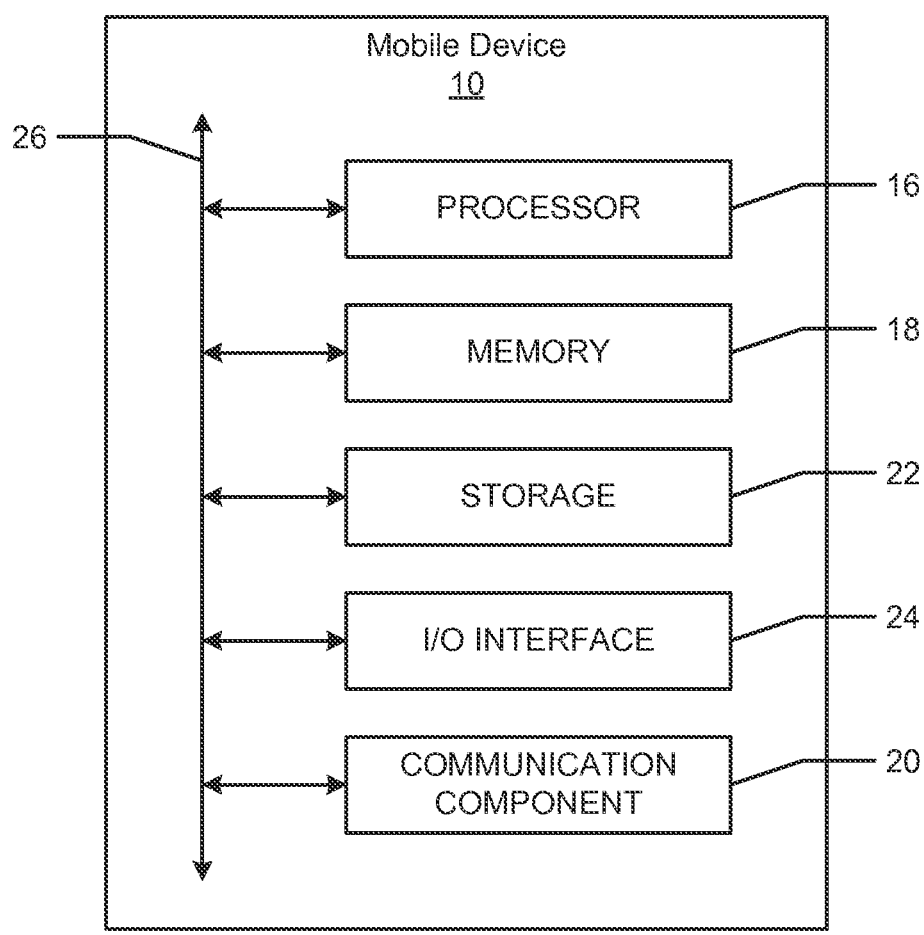
FIG. 4 illustrates example internal components of an example mobile device.

FIG. 4 illustrates example internal components of an example mobile device. Where appropriate, one or more mobile devices 10 may perform without substantial spatial or temporal limitation one or more steps of one or more methods described or illustrated herein. As an example and not by way of limitation, one or more mobile devices 10 may perform in real time or in batch mode one or more steps of one or more methods described or illustrated herein. In particular embodiments, one or more mobile devices 10 performs one or more steps of one or more methods described or illustrated herein. In particular embodiments, one or more mobile devices 10 provides functionality described or illustrated herein. In particular embodiments, software running on one or more mobile devices 10 performs one or more steps of one or more methods described or illustrated herein or provides functionality described or illustrated herein. Particular embodiments include one or more portions of one or more mobile devices 10.

In particular embodiments, mobile device 10 includes a processor 16, memory 18, storage 22, an input/output (I/O) interface 24, a communication component 20, and a bus 26. Although this disclosure describes and illustrates a particular mobile device having a particular number of particular components in a particular arrangement, this disclosure contemplates any suitable mobile device having any suitable number of any suitable components in any suitable arrangement. In particular embodiments, processor 16 includes hardware for executing instructions, such as those making up a computer program or application. As an example and not by way of limitation, to execute instructions, processor 16 may retrieve (or fetch) the instructions from an internal register, an internal cache, memory 18, or storage 22; decode and execute them; and then write one or more results to an internal register, an internal cache, memory 18, or storage 22.

In particular embodiments, processor 16 may include one or more internal caches for data, instructions, or addresses. This disclosure contemplates processor 16 including any suitable number of any suitable internal caches, where appropriate. As an example and not by way of limitation, processor 16 may include one or more instruction caches, one or more data caches, and one or more translation lookaside buffers (TLBs). Instructions in the instruction caches may be copies of instructions in memory 18 or storage 22, and the instruction caches may speed up retrieval of those instructions by processor 16. Data in the data caches may be copies of data in memory 18 or storage 22 for instructions executing at processor 16 to operate on; the results of previous instructions executed at processor 16 for access by subsequent instructions executing at processor 16 or for writing to memory 18 or storage 22; or other suitable data. The data caches may speed up read or write operations by processor 16. The TLBs may speed up virtual-address translation for processor 16. In particular embodiments, processor 16 may include one or more internal registers for data, instructions, or addresses. This disclosure contemplates a processor 16 including any suitable number of any suitable internal registers, where appropriate. Where appropriate, processor 16 may include one or more arithmetic logic units (ALUs); be a multi-core processor; or include one or more processors. Although this disclosure describes and illustrates a particular processor, this disclosure contemplates any suitable processor.

In particular embodiments, software executed by processor 16 may include an OS. The OS may include a kernel or any number of device drivers corresponding to one or more hardware components of mobile device 10. As an example and not by limitation, if mobile device 10 is a smartphone, then the OS may be a mobile operating system, such as for example, WINDOWS Phone, ANDROID, Symbian, IOS, or Bada. In particular embodiments, one or more software applications may be executed on mobile device 10. In particular embodiments, the applications may be native applications installed and residing on mobile device 10. As an example and not by way of limitation, an application (e.g. GOOGLE MAPS) may display a map on a touch screen, search for addresses and businesses, or provide directions to a geographic location; a second application may provide remote access to email; a third application (i.e. a web browser) may enable the device user to browse and search the Internet; a fourth application may control a camera to take photos or record videos; and a fifth application may allow the device user to receive and initiate voice-over Internet Protocol (VoIP) or cellular network calls. The software applications may have a user interface (UI) and may implement one or more specific functionalities. The software applications may include one or more software modules implementing the specific functionalities. The executable code of the software applications may be stored in memory 18 or storage 22 of mobile device 10.

In particular embodiments, memory 18 includes main memory for storing instructions for processor 16 to execute or data for processor 16 to operate on. As an example and not by way of limitation, mobile device 10 may load instructions from storage 22 or another source (such as, for example, another mobile device 10) to memory 18. Processor 16 may then load the instructions from memory 18 to an internal register or internal cache. To execute the instructions, processor 16 may retrieve the instructions from the internal register or internal cache and decode them. During or after execution of the instructions, processor 16 may write one or more results (which may be intermediate or final results) to the internal register or internal cache. Processor 16 may then write one or more of those results to memory 18. In particular embodiments, processor 16 executes only instructions in one or more internal registers or internal caches or in memory 18 (as opposed to storage 22 or elsewhere) and operates only on data in one or more internal registers or internal caches or in memory 18 (as opposed to storage 22 or elsewhere).

One or more memory buses (which may each include an address bus and a data bus) may couple processor 16 to memory 18. Bus 26 may include one or more memory buses, as described below. In particular embodiments, one or more memory management units (MMUs) reside between processor 16 and memory 18 and facilitate accesses to memory 18 requested by processor 16. In particular embodiments, memory 18 includes random-access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 18 may include one or more memories, where appropriate. Although this disclosure describes and illustrates particular memory, this disclosure contemplates any suitable memory.

In particular embodiments, storage 22 includes mass storage for data or instructions. As an example and not by way of limitation, storage 22 may include a hard-disk drive (HDD), a floppy disk drive, flash memory, or a combination of two or more of these. Storage 22 may include removable or non-removable (or fixed) media, where appropriate. Storage 22 may be internal or external to mobile device 10, where appropriate. In particular embodiments, storage 22 is non-volatile, solid-state memory. In particular embodiments, storage 22 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 22 taking any suitable physical form. Storage 22 may include one or more storage control units facilitating communication between processor 16 and storage 22, where appropriate. Where appropriate, storage 22 may include one or more storages 22. Although this disclosure describes and illustrates particular storage, this disclosure contemplates any suitable storage.

In particular embodiments, I/O interface 24 includes hardware, software, or both providing one or more interfaces for communication between mobile device 10 and one or more I/O devices. Mobile device 10 may include one or more of these I/O devices, where appropriate. One or more of these I/O devices may enable communication between a user and mobile device 10. As an example and not by way of limitation, an I/O device may include a keyboard, keypad, one or more sensors, touch screen, microphone, monitor, mouse, printer, scanner, speaker, digital still camera, stylus, trackball, video camera, another suitable I/O device or a combination of two or more of these. This disclosure contemplates any suitable I/O devices and any suitable I/O interfaces 24 for them. Where appropriate, I/O interface 24 may include one or more device or software drivers enabling processor 16 to drive one or more of these I/O devices. I/O interface 24 may include one or more I/O interfaces 24, where appropriate. Although this disclosure describes and illustrates a particular I/O interface, this disclosure contemplates any suitable I/O interface.

In particular embodiments, communication component 20 includes hardware, software, or both providing one or more interfaces for communication (such as, for example, packet-based communication) between mobile device 10 and one or more other mobile devices 10 or one or more networks. As an example and not by way of limitation, communication component 20 may include a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such as for example 3G, or Long Term Evolution (LTE) network. This disclosure contemplates any suitable network and any suitable communication component 20 for it. As an example and not by way of limitation, mobile device 10 may communicate with an ad hoc network, a personal area network (PAN), a LAN, a WAN, a MAN, or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate. Communication component 20 may include one or more communication components, where appropriate. Although this disclosure describes and illustrates a particular communication component, this disclosure contemplates any suitable communication component.

In particular embodiments, bus 26 includes hardware, software, or both coupling components of mobile device 10 to each other. As an example and not by way of limitation, bus 26 may include a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local bus (VLB), or another suitable bus or a combination of two or more of these. Bus 26 may include one or more buses 26, where appropriate. Although this disclosure describes and illustrates a particular bus, this disclosure contemplates any suitable bus or interconnect.

In particular embodiments, mobile device 10, may include one or more sensors, such as for example, an accelerometer, gyroscope, proximity sensor, light sensor, or biometric sensors. In particular embodiments, the sensors may detect movement of mobile device 10. As an example and not by way of limitation, an accelerometer may be configured to detect whether the mobile device 10 is moving and the speed of the movement. As another example, a gyroscope may be configured to detect movement of mobile device 10 through measurements of the orientation of mobile device 10. In particular embodiments, a sensors hub may be included in mobile device 10. Sensors of mobile device 10 may be connected to the sensors hub, which may be a processor that controls the sensors, manages power for sensors, processes sensor inputs, aggregates sensor data, or performs certain sensor functions. In particular embodiments, the sensor hub of mobile device 10 may process the environmental data obtained from the sensors to determine movement of mobile device 10. Although this disclosure describes detecting motion of a mobile device with particular sensors, this disclosure contemplates detecting motion of a mobile device with any suitable sensor or combination of sensors.

As described above, a signal sent by the social-networking system may activate one or more sensors of mobile device 10 to collect environmental data. As an example and not by way of limitation, the activation signal sent to the application of mobile device 10 may activate one or more sensors of mobile device 10 to obtain environmental data. Alternatively, one or more sensors of mobile device 10 may automatically and without input from the social-networking system send environmental data to the social-networking system as a periodic update, in response to a change in the environment of mobile device 10, or any combination thereof. In particular embodiments, the environmental data collected by one or more sensors of mobile device 10 may detect movement of mobile device 10. As an example and not by way of limitation, an accelerometer may detect a change of acceleration, such as for example from rest to motion, of mobile device 10 and automatically send environmental data to the social-networking system associated with movement of mobile device 10. As another example, a gyroscope may detect a change of orientation of mobile device 10 indicating movement of mobile device 10 and send data associated with movement of mobile device 10 to the social-networking system. As described above, environmental data from the sensors and location data from the location service of mobile device 10 may be sent to the social-networking system. In particular embodiments, the sensor hub may determine movement of mobile device based on the environmental data and send a signal to the social-networking system indicating a movement of mobile device 10 has occurred. As described above, the social-networking system may dynamically adjust the pre-determined sampling duration and polling frequency of the signal sent to the application of mobile device 10 based at least in part on the environmental data obtained by the sensors of mobile device 10 or the signal from mobile device 10 indicating movement has occurred.

Figure 5:
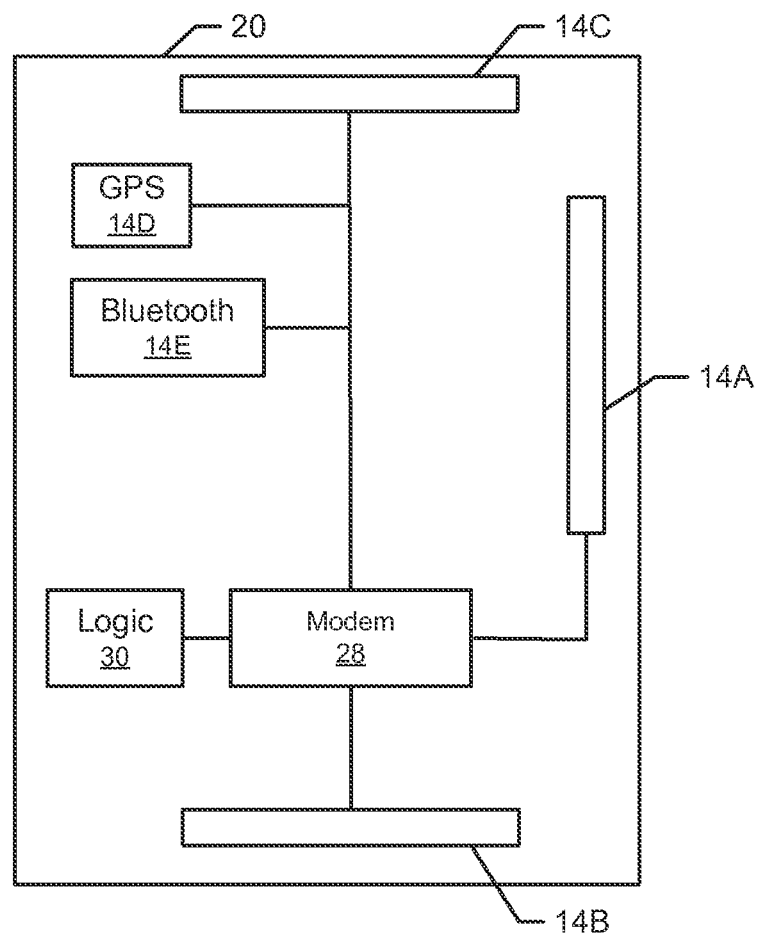
FIG. 5 illustrates an example communication component of an example mobile device.

FIG. 5 illustrates an example communication component of an example mobile device. As described above, communication component 20 of the mobile device may include one or more antennae 14A-E and one or more communication interfaces for wireless communication. As an example and not by way of limitation, antennae 14A-E supports use of wireless communication protocols such as for example, 3G, LTE, BLUETOOTH, WI-FI, GPS, etc. by mobile device 10. Each of the various wireless communication protocols tend to operate within a particular frequency range. Although this disclosure describes and illustrates antennae supporting particular wireless communication protocols, this disclosure contemplates antennae supporting any suitable wireless communication protocols. Modem 28 is coupled to antennae 14A-E and configures antennae 14A-E to operate at the particular frequency (i.e. resonant frequency) associated with the appropriate wireless protocol. Modem 28 is configured to processes the wireless communication signals received by antennae 14A-E. Herein, reference to a modem encompasses any suitable signal processing component that processes analog or digital wireless signals or performs a correction of wireless communication signals. Modem 28 may be coupled to logic 29 of communication component 16 or the processor of the mobile device.

As described above, antennae 14A-E are configured to convert a received EM signal into an electrical signal at the terminals of antennae 14A-E. The electrical signal at the terminals of antennae 14A-E is transmitted to modem 28. In particular embodiments, when the mobile device accesses the Internet through a 3G or LTE data network, a primary antenna 14A and a secondary antenna 14B is used. Modem 28 configures antennae 14A-B for use with one or more wireless protocols. Modem 28 is configured to optimize the efficiency of the power transfer between the antennae and the modem within the frequency range associated with the wireless protocol used by the mobile device, as described below. In particular embodiments, modem 28 transmits data encoding a response shift in the signals received by the mobile device to logic 30. Logic 29 may be configured to process the encoded response-shift data received from modem 28 and initiate changes to the configuration of the mobile device based on the received response-shift data.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks or diskettes, floppy disk drives (FDDs), magnetic tapes, solid-state drives (SSDs), RAM-drives, SECURE DIGITAL cards or drives, any other suitable computer-readable non-transitory storage medium, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiment may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a server, sending at a pre-determined polling frequency an activation signal waking from a sleep mode an application on a mobile computing device of a first user and causing the application to activate a location service of the mobile computing device for a time period of a pre-determined sampling duration, the pre-determined polling frequency and the pre-determined sampling duration being determined at least in part by detecting a movement of the mobile computing device;
by the server, receiving location data from the mobile computing device after the pre-determined sampling duration,
by the server, accessing a social graph of a social-networking system, the first user being a user of the social-networking system;
by the server, determining whether a current location of one or more second users is within a pre-determined proximity from the first user based on the received location data of the mobile computing device, the second users being users of the social-networking system and connected to the first user within the social graph;
by the server, determining that the current location of a second user of the one or more second users is within the pre-determined proximity from the first user;

by the server, accessing an action store of the social-networking system, the action store comprising actions performed by the first user and the second user of the social-networking system, a time associated with each of the actions, and statistical information for each of the actions;

by the server, determining one or more similar interests between the first and second users based on one or more actions performed by the first user and the second user, the time associated with each of the one or more actions, and the statistical information for each of the one or more actions when it is determined that the current location of the second user is within the pre-determined proximity from the first user; and by the server, notifying the first user of the location of the second user when it determined that the first user has one or more similar interests with the second user.

2. The method of claim 1, further comprising, after receiving the location data from the mobile computer device, reverting the application back to the sleep mode and deactivating the location service of the mobile computing device until a next activation signal is sent based on the pre-determined polling frequency.

3. The method of claim 1, further comprising:
by the server, determining a battery level of the mobile computing device,
wherein when the battery level is lower than a pre-determined level, decreasing the time period of the pre-determined sampling duration.

4. The method of claim 1, wherein detecting a movement of the mobile computing device further comprises:
by the server, determining a travel distance of the mobile computing device based on the received location data; and
by the server, adaptively adjusting the pre-determined polling frequency and pre-determined sampling duration based at least in part on the determined travel distance of the mobile computing device.

5. The method of claim 4, wherein when the travel distance is determined to be more than a pre-determined travel distance, sending lower-bandwidth information to the mobile computing device.

6. The method of claim 1,
wherein the travel distance is determined based at least in part on output from an accelerometer or gyroscope of the mobile computing device, and
wherein the location service comprises polling a location of a cellular tower, a location of a WI-FI hotspot, or a GPS function of the mobile computing device.

7. One or more computer-readable non-transitory storage media embodying software configured when executed to:
send at a pre-determined polling frequency an activation signal waking from a sleep mode an application on a mobile computing device of a first user and causing the application to activate a location service of the mobile computing device for a time period of a pre-determined sampling duration, the pre-determined polling frequency and the pre-determined sampling duration being determined at least in part by detecting a movement of the mobile computing device;
receive location data from the mobile computing device after the pre-determined sampling duration;
access a social graph of a social-networking system, the first user being a user of the social-networking system;
determine whether a current location of one or more second users is within a pre-determined proximity from the first user based on the received location data of the mobile computing device, the second users being users of the social-networking system and connected to the first user within the social graph;
determine that the current location of a second user of the one or more second users is within the pre-determined proximity from the first user;
access an action store of the social-networking system, the action store comprising actions performed by the first user and the second user of the social-networking system, a time associated with each of the actions, and statistical information for each of the actions;
determine one or more similar interests between the first and second users based on one or more actions performed by the first user and the second user, the time associated with each of the one or more actions, and the statistical information for each of the one or more actions when it is determined that the current location of the second user is within the pre-determined proximity from the first user; and
notify the first user of the location of the second user when it determined that the first user has one or more similar interests with the second user.

8. The media of claim 7, wherein the software is further configured to, after receiving the location data from the mobile computer device, revert the application back to the sleep mode and deactivate the location service of the mobile computing device until a next activation signal is sent based on the pre-determined polling frequency.

9. The media of claim 7, wherein the software is further configured to determine a battery level of the mobile computing device such that when the battery level is lower than a pre-determined level, the time period of the pre-determined sampling duration is decreased.

10. The media of claim 7, wherein detecting a movement of the mobile computing device further comprises:
determining a travel distance of the mobile computing device based on the received location data; and
adaptively adjusting the pre-determined polling frequency and pre-determined sampling duration based at least in part on the determined travel distance of the mobile computing device.

11. The media of claim 10, wherein when the travel distance is determined to be more than a pre-determined travel distance, sending lower-bandwidth information to the mobile computing device.

12. The media of claim 7,
wherein the travel distance is determined based at least in part on output from an accelerometer or gyroscope of the mobile computing device, and
wherein the location service comprises polling a location of a cellular tower, a location of a WI-FI hotspot, or a GPS function of the mobile computing device.

13. A device comprising:
a processor coupled to a storage; and
one or more computer-readable non-transitory storage media coupled to the processor and embodying software configured when executed to:
send at a pre-determined polling frequency an activation signal waking from a sleep mode an application on a mobile computing device of a first user and causing the application to activate a location service of the mobile computing device for a time period of a pre-determined sampling duration, the pre-determined polling frequency and the pre-determined sampling duration being determined at least in part by detecting a movement of the mobile computing device;

receive location data from the mobile computing device after the pre-determined sampling duration;

access a social graph of a social-networking system, the first user being a user of the social-networking system;

determine whether a current location of one or more second users is within a pre-determined proximity from the first user based on the received location data of the mobile computing device, the second users being users of the social-networking system and connected to the first user within the social graph;

determine that the current location of a second user of the one or more second users is within the pre-determined proximity from the first user;

access an action store of the social-networking system, the action store comprising actions performed by the first user and the second user of the social-networking system, a time associated with each of the actions, and statistical information for each of the actions;

determine one or more similar interests between the first and second users based on one or more actions performed by the first user and the second user, the time associated with each of the one or more actions, and the statistical information for each of the one or more actions when it is determined that the current location of the second user is within the pre-determined proximity from the first user; and notify the first user of the location of the second user when it determined that the first user has one or more similar interests with the second user.

14. The device of claim 13, wherein the software is further configured to, after receiving the location data from the mobile computer device, revert the application back to the sleep mode and deactivate the location service of the mobile computing device until a next activation signal is sent based on the pre-determined polling frequency.

15. The device of claim 13, wherein the software is further configured to determine a battery level of the mobile computing device such that when the battery level is lower than a pre-determined level, the time period of the pre-determined sampling duration is decreased.

16. The device of claim 13, wherein detecting a movement of the mobile computing device further comprises:

determining a travel distance of the mobile computing device based on the received location data; and adaptively adjusting the pre-determined polling frequency and pre-determined sampling duration based at least in part on the determined travel distance of the mobile computing device.

17. The device of claim 16, wherein when the travel distance is determined to be more than a pre-determined travel distance, sending lower-bandwidth information to the mobile computing device.

18. The device of claim 13, wherein the travel distance is determined based at least in part on output from an accelerometer or gyroscope of the mobile computing device, and wherein the location service comprises polling a location of a cellular tower, a location of a WI-FI hotspot, or a GPS function of the mobile computing device.

* * * * *